United States Patent [19]

Hasegawa

[11] Patent Number: 4,941,171
[45] Date of Patent: Jul. 10, 1990

[54] ELECTRONIC PRIVATE BRANCH EXCHANGE

[75] Inventor: Iwao Hasegawa, Tachikawa, Japan

[73] Assignee: Kabushiki Kaisha Toshiba, Kawasaki, Japan

[21] Appl. No.: 288,194

[22] Filed: Dec. 22, 1988

[30] Foreign Application Priority Data

Jan. 6, 1988 [JP] Japan .................................. 63-827

[51] Int. Cl.⁵ .............................................. H04M 3/02
[52] U.S. Cl. .................................... 379/233; 379/252; 379/396
[58] Field of Search ............... 379/233, 231, 164, 263, 379/221, 396, 252, 253

[56] References Cited

U.S. PATENT DOCUMENTS

| | | | |
|---|---|---|---|
| 4,286,118 | 8/1981 | Mehaffey et al. | 379/136 |
| 4,694,483 | 9/1987 | Cheung | 379/34 |
| 4,707,853 | 11/1987 | Hasegawa | 379/221 |
| 4,734,933 | 3/1988 | Barsellotti et al. | 379/164 |
| 4,744,103 | 5/1988 | Dahlquist et al. | 379/247 |

FOREIGN PATENT DOCUMENTS 0230492 10/1986 Japan .................................. 379/233

*Primary Examiner*—Thomas W. Brown
*Attorney, Agent, or Firm*—Finnegan, Henderson, Farabow, Garrett and Dunner

[57] ABSTRACT

An electronic private branch exchange having a function to cause a plurality of particular extension telephone sets to simltaneously respond to an incoming signal from the corresponding one of a plurality of main wire trunks. The exchange is capable of changing an extension telephone set at which an incoming signal tone is to be produced, in accordance with a time zone as needed. When there is an incoming signal from a main wire trunk, extension telephone sets to perform an incoming signal processing are searched from a first memory. A time zero in which an incoming signal tone is to be sent to the searched extension telephone sets is read from a second memory. If the read contents of the second memory and those of a third memory coincide, an incoming signal processing is performed, accompanied by a transmission of an incoming signal tone to those extension telephone sets. The contents of the third memory can be changed by a certain extension telephone set.

10 Claims, 4 Drawing Sheets

ELECTRONIC PRIVATE BRANCH EXCHANGE

BACKGROUND OF THE INVENTION

1. Field of the Invention

The present invention relates to electronic private branch exchanges which have a function to cause a plurality of specific extension telephone sets to respond to an incoming signal from a corresponding main wire trunk and, more particularly, to electronic private branch exchanges which are capable of changing extension telephone sets which are caused to produce an incoming signal tone as needed according to time zones.

2. Description of the Related Art

Conventionally there have been used two types of reception of an incoming signal to a private branch exchange from a main wire trunk, one being first by an attendant console and the other being directly by an extension telephone. The latter is a so-called "direct inward dialling system". In the direct inward dialling system, generally there are provided a plurality of extension telephone sets for reception of an incoming signal from the corresponding one of the main wires. For example, a plurality of extension telephone sets can simultaneously receive and each respond to an incoming signal from the corresponding main wire trunk. Generally, high function telephone sets (EKTs) each have a particular one of a plurality of button keys allocated to the corresponding main wire. When there is an incoming signal from that main wire, a light emitting diode (LED) for the particular key of each EKT flashes, and the incoming tone is produced simultaneously at that particular EKT. In order to respond to the incoming signal, the flashing key of the EKT may be only pressed.

Another such direct inward dialling system using EKTs is to only flash a LED for the particular key of each EKT without producing an incoming signal tone.

A further direct inward dialling system is the simultaneous use of a subsystem in which an incoming signal is reported both by production of an incoming signal tone and by flashing of a LED for an EKT and a second subsystem in which an incoming signal is reported only by flashing a LED for another EXT.

The effect of this system is that particular ones of the EKTs which respond to an incoming signal are virtually determined. In other words, an incoming signal tone is be required to be produced only at particular EKTs for persons responsible at all times for responding to the incoming signals at all times. Usually, production of an incoming signal tone at particular telephone sets is effective for only persons who must respond to that incoming signal and other incoming signal tones are only noisy to those persons.

Whether particular EKTs are set to produce an incoming signal tone when there is an incoming signal is determined on their installation, so that change is not easy. Thus such EKTs are inconvenient when they are desired to be switched between production and non-production of an incoming signal tone according to time zones. In the use of a direct inward dialling system at general business firms, different persons may be concerned as responders with the direct inward dialling system generally according to time zones such as morning, lunch time, afternoon or night. Also, in such a case, incoming signal tones were produced at particular EKTs in the past.

Setting of production or non production of an incoming signal tone at particular EKTs in the direct inward dialling system is virtually half-fixed conventionally and it is not easy to change such EKTs to others also according to time zones.

It is therefore an object of the present invention to eliminate such problems to thereby allow switching between production and non-production of an incoming signal tone at particular EKTs according to time zones.

SUMMARY OF THE INVENTION

In order to achieve the above object, the present invention provides an electronic private branch exchange comprising: a plurality of line circuits corresponding to a like number of extension telephone sets; a plurality of main wire trunks corresponding to a like number of main wires; incoming signal control means for putting any particular ones of the plurality of extension telephone sets in corresponding relationship to each of the main wire trunks and for causing an incoming signal from that main wire trunk to be received at the particular extension telephone sets; means for setting from a certain one of the extension telephone sets a time zone in which an incoming signal tone is to be produced at particular ones of the extension telephone sets; and means for sending to the particular extension telephone sets a signal to produce an incoming signal tone at those extension telephone sets in the time zone set by the setting means. The incoming signal control means includes: a first memory for storing the port numbers of the extension telephone sets where an incoming signal from the corresponding main wire trunk is received; and means for searching from the first memory extension telephone sets to perform an incoming signal processing when there is an incoming signal from the corresponding main wire trunk. The setting means includes: a second memory for storing information indicative of a time zone in which an incoming signal tone is to be produced at each extension telephone set on reception of an incoming signal from the corresponding main wire trunk; a third memory for storing information indicative of a time zone in which an incoming signal tone is to be produced; means for changing the stored contents of the third memory from a certain extension telephone set; and means for comparing, when there is an incoming signal for the extension telephone sets, the contents of the second memory and the third memory and for setting as the extension telephone set at which the incoming signal tone is to be produced an extension telephone set on which the contents of the second and third memories are equal.

In the present invention, when there is an incoming signal from the corresponding main wire trunk, an extension telephone set which performs an incoming signal processing is searched from the first memory, and data on a time zone during which an incoming signal tone is to be sent to the searched extension telephone set is read from the second memory. When the read data indicative of the time zone and the data in the third memory are equal, an incoming signal processing is performed, inclusive of sending an incoming signal tone to the extension telephone set. Since the contents of the third memory are changeable, an incoming signal processing can be performed inclusive of sending an incoming signal tone to a different extension telephone set by changing the contents of the third memory.

Thus according to the present invention, switching is possible between production and non-production of an incoming signal tone according to time zones.

DESCRIPTION OF THE PREFERRED EMBODIMENTS

An embodiment of the present invention will now be described in detail with reference to the drawings.

Figure 1:
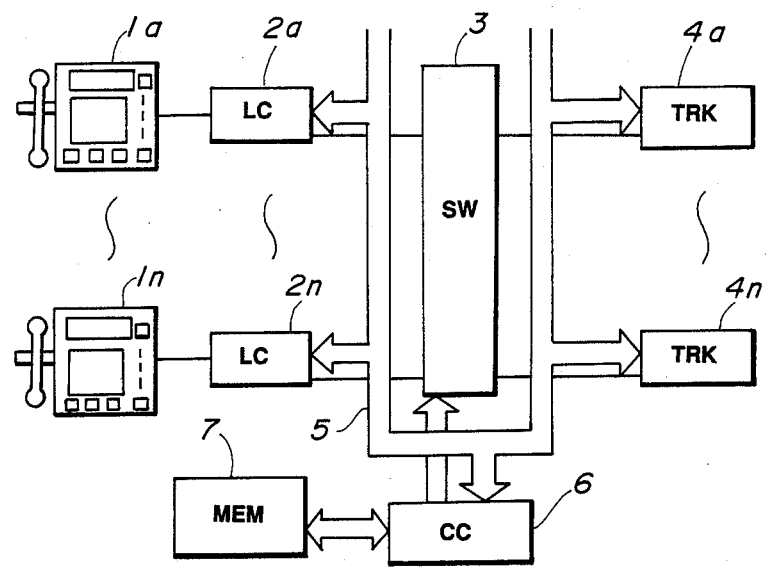
FIG. 1 is a schematic of an electronic private branch exchange.

FIG. 1 is a schematic of an electronic private branch exchange according to the embodiment. A plurality of electronic key telephones (EKTs) 1a-1n are connected through line circuits (LCs) 2a-2n to a talking channel network (SW) 3. The network 3 is connected through main wire trunks (TRKs) 4a-4n to corresponding main wires (not shown). The talk channel network 3, line circuits 2a-2n and main wire trunks 4a-4n are connected through a control bus 5 to a central processing unit (CC) 6. The central processing unit 6 which uses data stored in a memory (MEM) 7 to perform control operations. Talking channels among electronic key telephones 1a-1n and between the key telephones 1a-1n and the main wires are provided by the network 3 which transmits and receives data to and from the central processing unit 6.

Figure 2:
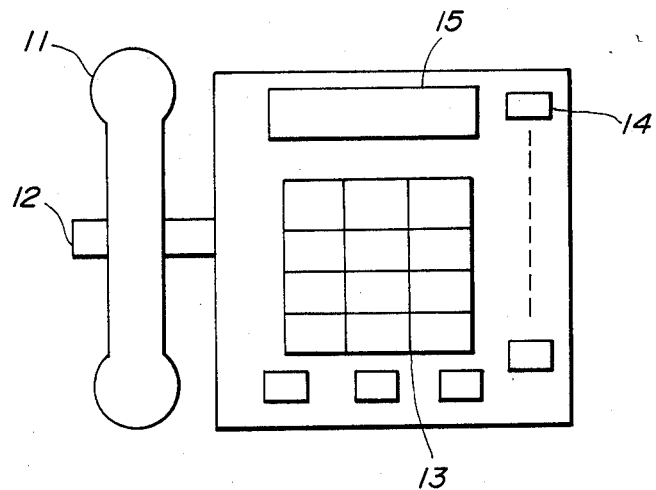
FIG. 2 is a schematic of an electronic key telephone.

FIG. 2 is a plan view of one of the electronic key telephones 1a-1n which include a handset 11, a blocking mechanism 12, a dialling mechanism 13, a key button unit of various service key buttons 14, a liquid crystal display (LCD) 15, etc. The service key button unit 14 includes keys which set and change a time zone section and a key which is used to respond to an incoming signal from the corresponding wire trunk circuit.

Figure 3:
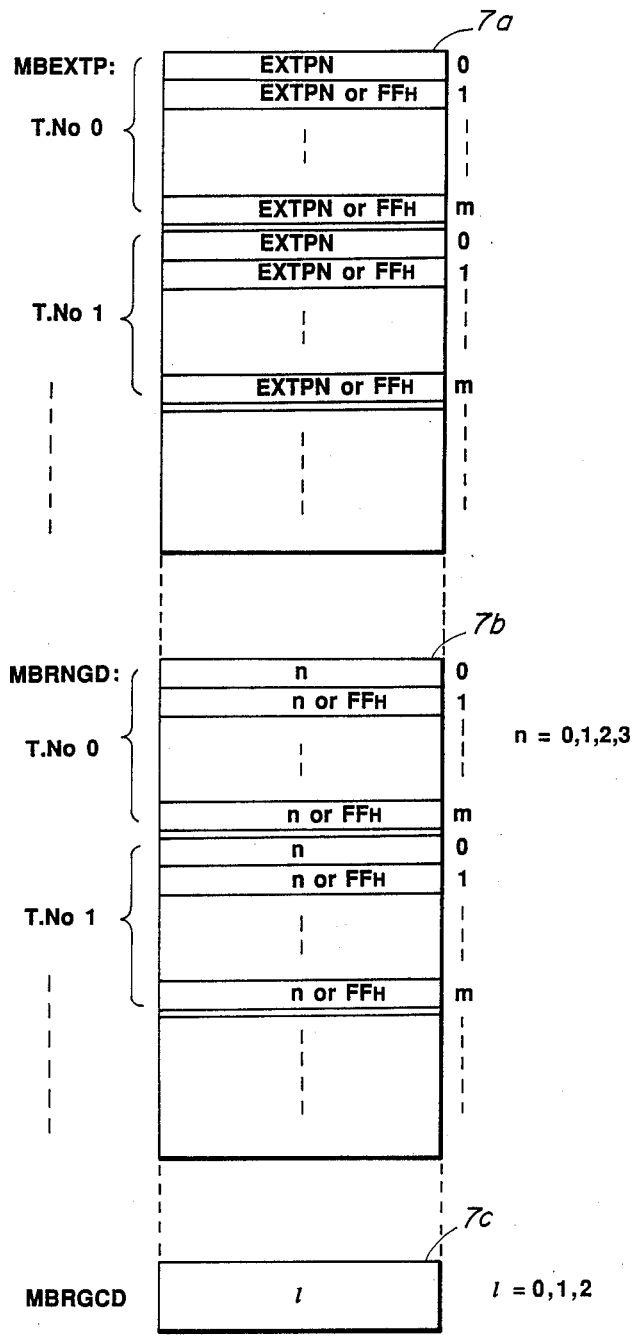
FIG. 3 is a schematic of a memory.

FIG. 3 shows a map of the memory (MEM) 7 which includes memory units (MBEXTP) 7a, (MBRNGD 7b and (MBRGCD) 7c. The memory unit 7a stores for each of trunk numbers (T, No) given to the corresponding trunk circuits the port numbers (EXTPNs) of key telephones to which an incoming signal, if any, from that one of the trunk circuits 4a-4n is transferred. In the memory unit 7a, a maximum of (m+1) key telephones at which a probable incoming signal is to be received can be registered and stored for each trunk circuit. In the respective areas of the memory unit 7a, the port numbers of the key telephones and particular values (here, FFHs) for unregistered key telephones are stored. The memory unit 7b includes a memory map with the main wire trunk numbers, the port numbers of the key telephones which receive an incoming signal from the corresponding one of the main-wire trunk circuits, and time zone sections in which incoming signal tones are to be produced at the key telephones. In this embodiment, one of values "00", "01", "02" is stored as a time zone section. For example, the "00" denotes a time zone section from 8:00 to 12:00 a.m., the "01" a time zone from 12:00 a.m. to 1:00 p.m., and the "02" a time zone from 1:00 p.m. to 8:00 a.m., next morning. In the memory locations which no key telephone numbers corresponding to each of the trunk circuits are stored, particular values (here, FFHs) are stored. The memory unit 7c has a value which is updated by the key operation of a particular key telephone. The value is one of the "00", "01" and "02" which correspond to the values which the memory unit 7b can take. Namely, the "00" corresponds to the time from 8:00 a.m. to 12:00 a.m., "01" to the time from 12:00 a.m. to 1:00 a.m., and "02" to the time from 1:00 a.m. to 8:00 a.m., next morning.

Figure 4:
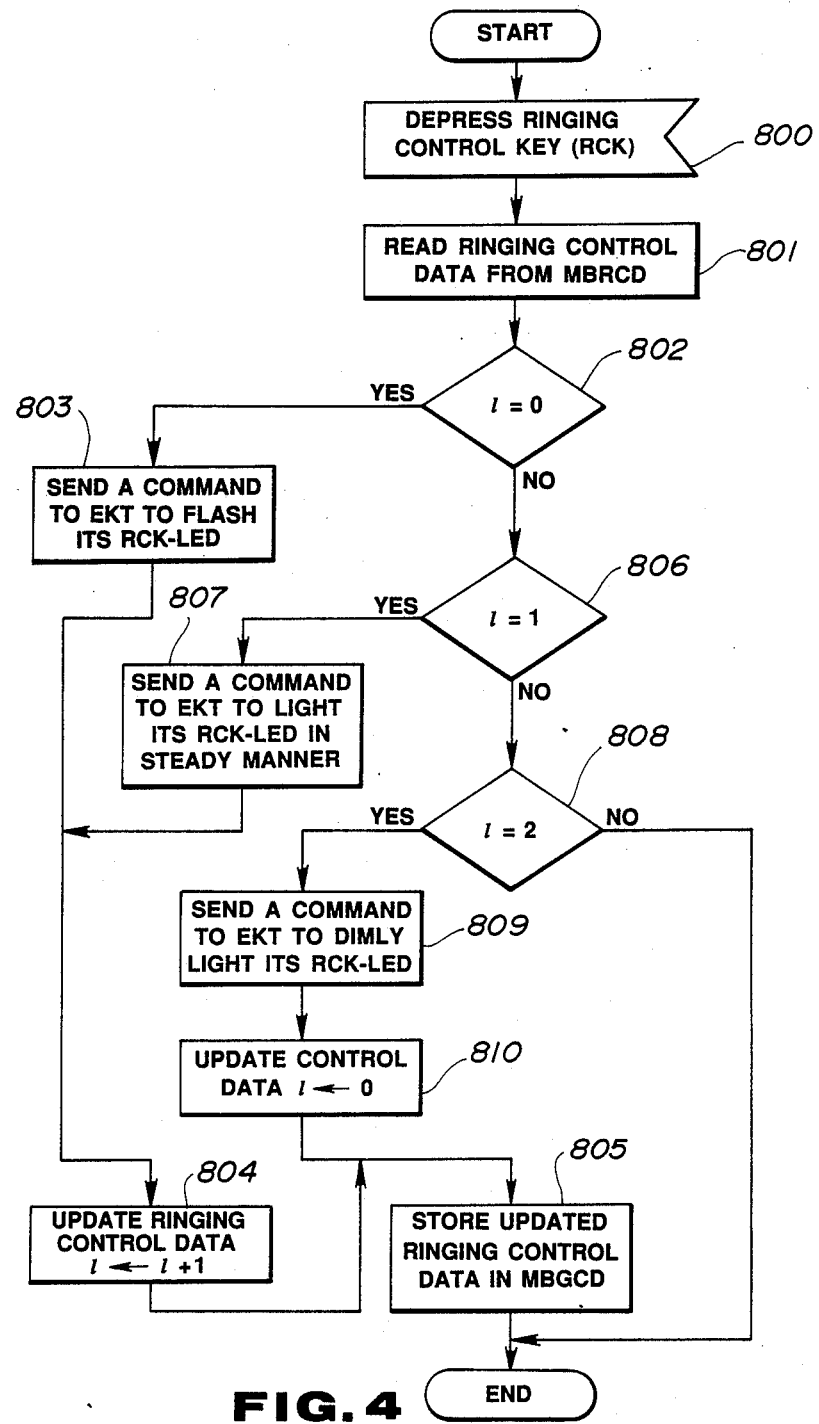
FIG. 4 is a flowchart showing setting of a time zone.

Changing of a system time zone from a particular key telephone will be described using a processing flow in FIG. 4. First, a key, allocated as a ringing control key "RCK", of the service key button unit 14 of the particular key telephone 1n is depressed (step 800). By this operation, a signal indicative of the depression of the ringing control key "RCK" is transmitted to CC6 via the line circuit 2n and control bus 5. When the central processing unit 6 receives the signal indicative of the depression of the ringing control key "RCK", it reads as the ringing control data the value stored in the memory 7c (step 801). The central processing unit then checks to see if the value of the ringing data 1 is "00" (step 802). If so, the processing unit 6 transmits a flash signal to the key telephone via the control bus line 5 and the line circuit 2n in order to flash the diode (LED) corresponding to the control key "RCK" of that telephone (step 803). In order to update the ringing control data, the processing unit 6 adds one to the value read from the memory 7c (step 804). It further writes the updated value into the memory 7c (step 805). Thus the ringing control data is updated from "00" to "01", and the light emitting diode (LED) of the ringing control key "RCK" shows a flashing pattern to indicate that the ringing control data is "01", namely, the current system time zone is between 12:00 and 1:00 a.m. When the ringing control key "RCK" is depressed and the contents of the memory 7c are not "00", the central processing unit 6 checks whether the contents of the memory 7c are "01" (step 806). When the contents of the memory 7c are "01", the central processing unit 6 sends a steady-lighted signal to the key telephone 1n via the same path as it has sent the flash signal in order to put the LED of the ringing control key "RCK" in the steady lighted state (step 807). The central processing 6 then adds one to the memory 7c contents to update same (step 804) and stores the updated value in the memory 7c (step 805). Thus, the current system time zone is updated to the time zone from 1:00 p.m. to 8:00 a.m., next morning and in order to display that the current time zone is that time zone, the LED of the ringing tone control key "RCK" of the key telephone 1n takes a pattern of steady lighting. If the memory 7c value is not "01" when the ringing control key "RCK" is depressed, the central processing unit 6 checks to see if the contents of the memory 7c are "02" (step 802). If not, the processing unit 6 ends that processing without doing any other processing. If the contents of the memory 7c are "02", the processing unit 6 transmits a dim-lighting signal to the key telephone 1n via the same path as that used for the transmission of the flashing signal, in order to dimly light the LED of the ringing control key "RCK" (step 809). The central processing unit 6 updates the memory 7c value to "00" (step 810) and writes the updated "00" value into the memory 7c (step 805). Thus, the current system time zone is updated to a time zone from 8:00 a.m. to 12:00 a.m., and the LED of the ringing control key "RCK" is lighted in a pattern of dim lighting in order to display that fact. As will be obvious from the above description, the system can take and update three kinds of time zones mentioned above by depressing the control key "RCK" of the key telephone 1n.

Figure 5:
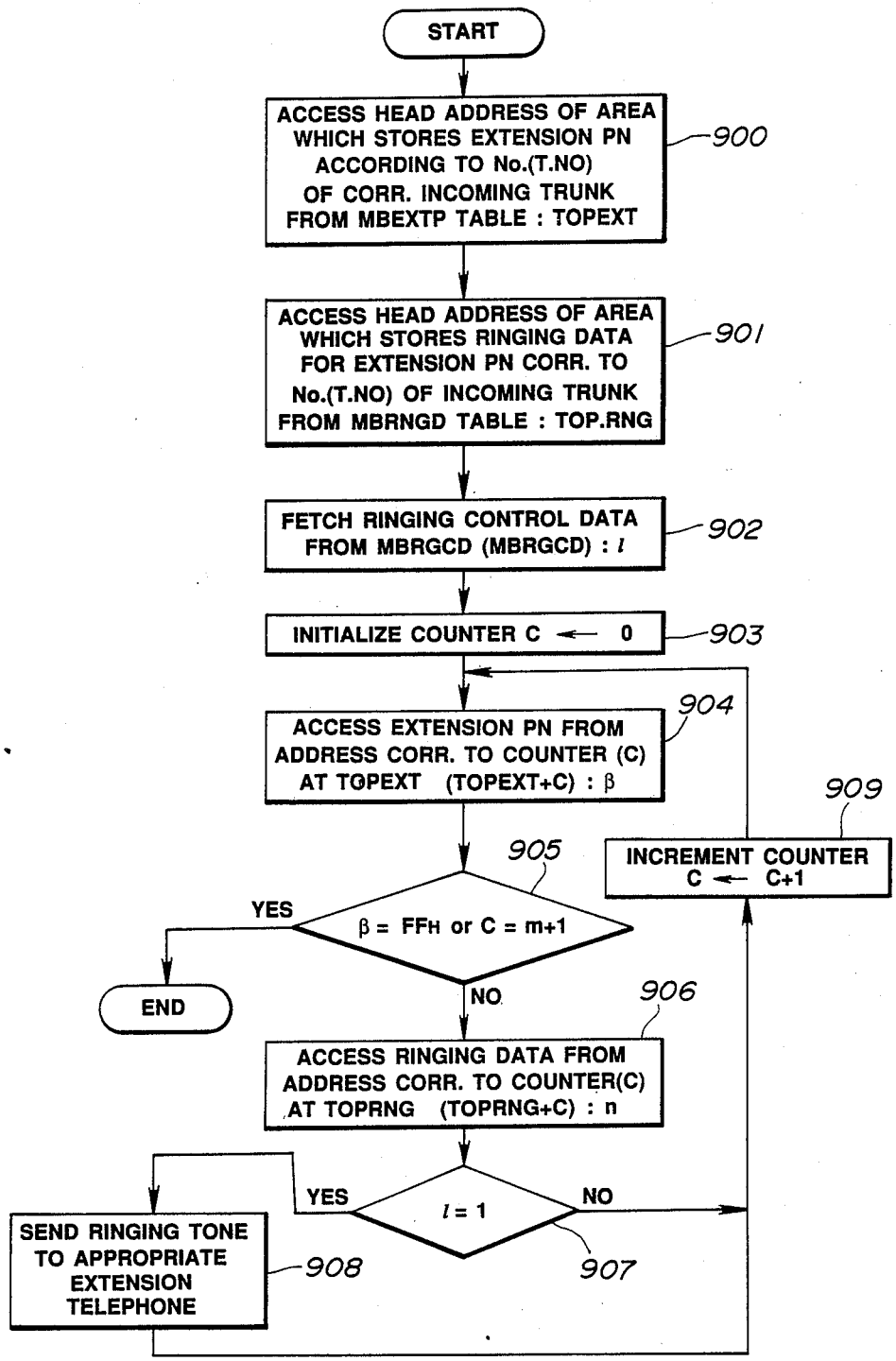
FIG. 5 is a flowchart showing transmission of en incoming signal tone to an electronic key telephone.

The transmission of an incoming signal tone to a key telephone EKT performed when there is an incoming signal from a trunk circuit will be described using the processing flow of FIG. 5. Any incoming signal processing other than the transmission of the incoming signal tone will not be described here. Now the operations performed when there is an incoming signal from the trunk 4b will be described. The central processing unit 6 receives that incoming signal via the control bus line 5 from the trunk circuit 4b. The central processing unit 6 performs a series of incoming signal processing operations on the corresponding key telephones on reception of the incoming signal. The transmission of the incoming signal tone among the incoming signal processing operations will be performed as follows. First, the processing unit 6 reads the head address of the memory 7a corresponding to the trunk number (T.No) in order to search the key telephone at which the incoming signal is to be received (step 900). Here, if the T, No of the trunk circuit 4b is No. 1, the head address is changed to a value of TOPEXT. The central processing unit 6 then accesses the head address of the memory 7b which stores the time zones for the destination key telephones and corresponding to the trunk circuit at which there has been the incoming signal. (step 901). Assume here that the address data is changed to a value of TOPRNG. In order to examine the current system time zone, the processing unit 6 reads the stored contents (hereinafter referred to the "l") from the memory 7c (step 902). For convenience of the subsequent processing, a counter C (not shown) is then initialized (set to 00) (step 903). After these pre-processing operations, the central processing unit 6 takes a new address including the address TOPXET+the counter C count, and checks to see if there is an electronic key telephone EKT to process the incoming signal from the incoming trunk (step 905). If the new address is FFH, or the contents of the counter C are m+1 which exceeds a maximum, the processing unit ends that processing by determining that there are no destination key telephones or that the transmitting processing of the incoming signal tone in the incoming signal processing has been completed. Assume now that the address value is not FFH and the counter C count is smaller than m+1. At this time, the central processing unit 6 reads the address value n including the address TOPRNG plus the counter C count (step 906). The central processing unit checks to see if the read value n and the previously read value l are equal (step 907). If so, the processing unit 6 transmits a ringing signal to the port of the key telephone read from the address TOPEXT to produce an incoming signal tone at that key telephone in the same path through which the lighting signal was sent to the LED of the ringing control key "RCK" of that key telephone EKT. Thus the incoming signal tone is produced at the key telephone the port number of which is stored at the address TOPEXT. The central processing unit 6 then updates the counter C value in order to perform the same processing for a key telephone the port number of which is stored at the next address TOPEXT (step 909). As described above, the central processing unit 6 checks to see the necessity for production/non-production of an signal tone for all the key telephones corresponding to the incoming signal trunk circuit and performs the corresponding processing operations.

Thus according to the particular embodiment, an incoming signal tone can be produced at, and the corresponding incoming signal can then be received at, a different extension telephone set by changing the value set at the memory 7c.

The present invention has been described above with respect to an embodiment in which switching is made possible between production and non-production of an incoming tone according to time zones.

However, it should be of course understood that the invention may be embodied in other specific forms without any departure from the spirit or essential characteristics thereof.

For example, switching between production and non-production of an incoming tone may be possible according to date zones or according to combinations of date zones and time zones.

What is claimed is:

1. An electronic private branch exchange, comprising:
   a plurality of line circuits corresponding to a plurality of extension telephone sets respectively;
   a plurality of main wire trunks corresponding to a plurality of main wires respectively;
   incoming signal control means for inputting particular ones of the plurality of extension telephone sets in corresponding relationship to each of the main wire trunks and for causing an incoming signal from that main wire trunk to be responded to at the particular extension telephone sets;
   means for setting from a certain one of the extension telephone sets a time period zone in which an incoming signal tone is to be produced at particular ones of the extension telephone sets; and
   means for sending a signal to the particular extension telephone sets to produce an incoming signal tone at those extension telephone sets in the time period zone set by the setting means, herein the setting means includes;
   a first memory means for storing information indicative of a time period zone in which an incoming signal tone is to be produced at each extension telephone set on reception of an incoming signal from the corresponding main wire trunk;
   a second memory means for storing information indicative of a time period zone in which an incoming signal tone is to be produced;
   means for changing the stored contents of the second memory means from a certain extension telephone set; and
   means for comparing, when there is an incoming signal for the extension telephone sets, the contents of the first memory means and the second memory means and for setting as the extensions telephone set at which the incoming signal tone is to be produced an extension telephone set for which the contents of the first and second memory means are equal.

2. An electronic private branch exchange comprising:
   a plurality of line circuits corresponding to a plurality of extension telephone sets;
   a plurality of main wire trunks corresponding to a plurality of main wires, respectively;
   a memory means for storing data indicative of the extension telephone sets where an incoming signal from the corresponding main wire trunk is responded to;
a second memory means for storing for each extension telephone set a time period zone in which an incoming signal tone is to be sent to that extension telephone set on reception of an incoming signal from the corresponding main wire trunk;
a third memory means for storing a time period zone;
means for changing the time period zone stored in the third memory means from a certain extension telephone set;
means for searching from the first memory means an extension telephone set which is to perform an incoming signal processing when there is an incoming signal from the corresponding main wire trunk; and
means for comparing the contents of the second memory means corresponding to the searched extension telephone set and the contents of the third memory means to send an incoming signal tone to only an extension telephone set on which the compared contents of the second and third memory means coincide.

3. An electronic private branch exchange according to claim 2, wherein the second memory means stores a plurality of numerical data segments each indicative of a time period zone.

4. An electronic private branch exchange according to claim 3, wherein the third memory means stores any particular one of the plurality of numerical data segments stored in the second memory means.

5. An electronic private branch exchange according to claim 3, wherein the plurality of numerical data segments stored in the second memory means are successive numerical data segments.

6. An electronic private branch exchange according to claim 4, wherein the changing means changes the contents of the third memory means by sequentially adding a predetermined numerical value to the content of the third memory means.

7. An electronic private branch exchange according to claim 2, wherein the first memory means has a storage area which is divided into a plurality of storage subareas corresponding to the number of main wire trunks, data segments indicative of the extension telephone sets corresponding to each of the main wire trunks which in turn correspond to the storage subareas being stored in order in each storage subarea; and
wherein the second memory means has a storage area which is divided into a plurality of storage subareas corresponding to the number of main wire trunks, data segments indicative of time period zones on extension telephone sets corresponding to each of the main wire trunks which in turn correspond to the storage subareas being stored in order in each storage subarea.

8. An electronic private branch exchange according to claim 7, wherein when there is an incoming signal from a main wire trunk, the comparing means sequentially searches the respective contents of the first and second memory means corresponding to the main wire trunk from which the incoming signal is received, starting with the head addresses of the first and second memory means; examines, when the data segments stored in the second and third memory means coincide, the contents of the first memory means at an address corresponding to the addresses where the coinciding data are stored in the second and third memory means; and determines from the contents stored in the first memory means an extension telephone set at which an incoming signal tone is to be produced.

9. An electronic private branch exchange comprising:
a plurality of main wire trunks corresponding to a plurality of main wires respectively;
a plurality of line circuits corresponding to a plurality of extension telephone sets respectively, each said extension telephone set having a time period zone during which each said telephone set responds to an incoming call from the main wire;
incoming signal control means for putting particular ones of the plurality of extension telephone sets in corresponding relationships to each of the main wire trunks and for causing an incoming signal from that main wire trunk to be responded to at the particular extension telephone sets;
means for setting a final time period zone in which an incoming signal tone is to be produced at particular ones of the extension telephone sets by a comparison between a predetermined time period zone and a modification time period zone from certain ones of the extension telephone sets; and
means for sending a signal to the particular extension telephone sets to produce an incoming signal tone at those extension telephone sets in the final time period zone set by the setting means.

10. An electronic private branch exchange according to claim 9, wherein the incoming signal control means includes:
a first memory for storing the port numbers of the extension telephone sets where an incoming signal from the corresponding main wire trunk is responded to; and
means for searching from the first memory extension telephone sets to perform an incoming signal processing when there is an incoming signal from the corresponding main wire trunk.

* * * * *